US006965569B1

(12) United States Patent
Carolan et al.

(10) Patent No.: US 6,965,569 B1
(45) Date of Patent: Nov. 15, 2005

(54) FLEXIBLE SCALABLE FILE CONVERSION SYSTEM AND METHOD

(75) Inventors: Shawn T. Carolan, Los Gatos, CA (US); Martin T. Wegner, Hoffman Estates, IL (US); Antonio Dutra, Chicago, IL (US); Omprasad S. Nanydal, Yelm, WA (US)

(73) Assignee: Net2Phone, Inc., Newark, NJ (US)

( * ) Notice: Subject to any disclaimer, the term of this patent is extended or adjusted under 35 U.S.C. 154(b) by 893 days.

(21) Appl. No.: 09/651,321

(22) Filed: Aug. 31, 2000

Related U.S. Application Data

(63) Continuation-in-part of application No. 08/971,095, filed on Nov. 14, 1997, which is a continuation-in-part of application No. 08/582,475, filed on Jan. 4, 1996, now Pat. No. 5,712,907, which is a continuation of application No. 08/529,923, filed on Sep. 18, 1995, now abandoned.

(51) Int. Cl.[7] ............................................. H04Q 3/00

(52) U.S. Cl. ................... 370/238; 370/466; 379/93.15; 709/241

(58) Field of Search ................................ 370/465, 466, 370/265, 238, 238.1; 709/230, 232, 241, 709/400, 238; 707/523; 455/74; 379/221.06, 379/93.15; 719/400

(56) References Cited

U.S. PATENT DOCUMENTS

| 6,134,235 A * | 10/2000 | Goldman et al. ............ 370/352 |
| 6,208,638 B1 * | 3/2001 | Rieley et al. ................ 370/354 |
| 6,597,688 B2 * | 7/2003 | Narasimhan et al. ....... 370/353 |
| 6,741,608 B1 * | 5/2004 | Bouis et al. ................. 370/465 |

* cited by examiner

*Primary Examiner*—Alpus H. Hsu
*Assistant Examiner*—Justin M. Philpott
(74) *Attorney, Agent, or Firm*—Pillsbury Winthrop Shaw Pittman LLP

(57) ABSTRACT

A file conversion system provides a plurality of network computing platforms, each computing platform having one or more conversion engines executing thereon. When a file is to be transferred, a plurality of destination file types is determined. If all destination file types are different from the file's current type, the file is converted to a file having a type corresponding to one of the destination file type. If the file needs to be converted, then a conversion path, potentially passing through multiple conversion engines associated with a least conversion cost is chosen to perform the conversion. The file is sent to the computing platform on which the conversion engines associated with the least cost conversion are executing. Moreover, the least cost conversion can take into account the destination cost. Conversion costs are determined using a table of costs for performing various conversions. The table stores both static costs which remain constant during system operation and dynamic costs which vary with system operation.

28 Claims, 10 Drawing Sheets

| Engine | Source | Destination | Static Cost | Dynamic Cost | Computing Platform Address | Special Delivery |
|---|---|---|---|---|---|---|
| Conversion Engine 1 | TEXT | POSTSCRIPT | A | B | 205.166.150.141 | T |
| Conversion Engine 2 | POSTSCRIPT | TIFF | C | D | 205.166.150.141 | T |
| Conversion Engine 3 | TEXT | TIFF | E | F | 205.166.150.152 | T |

FLEXIBLE SCALABLE FILE CONVERSION SYSTEM AND METHOD

The present application is a continuation-in-part of U.S. patent application Ser. No. 08/971,095, filed on Nov. 14, 1997, which is a continuation-in-part of U.S. patent application Ser. No. 08/582,475, filed on Jan. 4, 1996 (U.S. Pat. No. 5,712,907), which is a continuation of U.S. patent application Ser. No. 08/529,923, filed Sep. 18, 1995 (now abandoned), all of which are hereby incorporated by reference herein in their entireties.

BACKGROUND

Field of Invention

The present invention relates generally to the field of unified messaging. More specifically, the present invention relates to the field of data format conversion systems.

BACKGROUND OF THE INVENTION

Unified messaging is a quickly emerging technology that will allow people to send and receive messages from and to a variety of different types of message communicating devices (MCDs). The different MCDs communicate with one another using various data state or states (e.g., file formats) including, for example, voice, fax, email, music, video, and image data. Consequently, there is a need for systems that can convert files from one data state to any other data state. For example, a facsimile machine may need to communicate with an email server by sending a TIFF file to a recipient's email box. To reduce the size of the file, it might be desirable to first compress the file to a text format, via optical character recognition. (OCR). Conventionally, this conversion is done by the sending facsimile machine or a server to which the facsimile machine is connected. Unfortunately, the sending facsimile machine or server may not have routines to perform the required conversion, or may not be able to execute the required conversion engine optimally.

Thus, a significant problem in the art is converting messages from one data state to any other data state or states in an efficient manner. There are a variety of conversion routines or conversion engines that can be executed on a variety of computing platforms. For example, Quick View Plus, available from Inso Corporation, Boston Mass., is a conversion engine that converts text documents to a TIFF format. a2 ps is a public domain text-to-Postscript converter. Ghostscript is a Postscript-to-TIFF conversion engine available from Aladdin Enterprises, Menlo Park, Calif. Voice Xpress is a text to WAV conversion engine available from LERNOUT & HAUSPIE (L&H), Burlington, Mass. Optical character recognition (OCR) is a well-known bit map-to-text conversion technology. An exemplary OCR conversion engine is CunieForm available from Cognitive Technology Corp., Madera, Calif. ViaVoice, is a WAV-to-text conversion engine available from IBM Corp., Armonk, N.Y. InfotheK 2000. Reformat is a conversion engine for TIFF-to bit map conversions available from Informatik. MusicMatch Jukebox is a WAV to MP3 conversion engine available from MusicMatch, Inc., San Diego, Calif. Each of these conversion engines, however, is an independent process that is not designed to communicate with other conversion routines. Consequently, conversion is often inefficient and inflexible.

A related problem is that of efficient use of network resources, specifically conversion engines. Not every computing platform can execute every conversion. Furthermore, it is often the case that certain computing platforms are configured to execute certain conversion engines optimally. Efficient use of these resources remains a significant unsolved problem.

Further compounding the problem is the fact that in conventional systems, conversion engines located on remote systems can be used only through coordination with a human operator. A file to be converted from one data state to another is transferred to a computing platform on which a needed conversion engine is executing. A human operator waits for the file, and when it arrives, or more likely some not insignificant time thereafter, executes the conversion routine on the file to be converted and returns the converted file back to the sender. Thus, coordination between computer operators located remotely to one another is required to complete the file conversion. Such coordination can prove difficult and is often not carried out in a timely manner. Moreover, the conversions are not scalable. That is, adding and managing additional conversion engines to conventional systems is often a difficult task.

SUMMARY OF THE INVENTION

The present invention is a distributed conversion system that is centrally managed. One aspect of the present invention is the ability to perform conversions from one data state to any other data state or states. Conversions requiring intermediate conversion steps can be performed, providing a flexibility not found in conventional systems. The intermediate steps often require performing conversions using remotely located conversion engines, i.e., conversion engines located on different computing platforms. Moreover, the present invention facilitates the addition and management of new conversion capabilities to the system.

Because the present invention is centrally managed, the addition and management of new conversion capabilities are significantly simplified over conventional systems. The system and method of the present invention also provide load balancing to efficiently use network resources. In one implementation of the present invention, conversions are performed on appropriate conversion engines executing on the least busy computing platforms. For example, if there are 5 text-to-TIFF conversion computing platforms on the network, the system can determine which is the least busy and send the next text-to-TIFF conversion to the least busy of the eligible computing platforms. Other kinds of load balancing can be applied, including for example, a conversion engine executing on the least recently used node and statistical load balancing based on historical node usage.

Moreover, the conversion system of the present invention can adapt to its environment dynamically to complete required conversions. For example, if all of the text-to-TIFF computing platforms are busy, the system can determine an alternate way of converting text to TIFF. For example, the system may locate an available text-to-Postscript conversion engine and Postscript-to-TIFF conversion engine. In that case, the system would send the file to the computing platform on which the text-to-Postscript conversion engine is running, where the file is converted to Postscript. The system would then send the Postscript file to the computing platform on which the Postscript to TIFF conversion engine is running to convert the file to a TIFF format. This ability to find alternate paths for conversions also provides the system of the present invention with a fault tolerance capability not present in conventional systems. This fault tolerance capability arises from the ability to route around failed conversion elements.

Thus, there are significant benefits provided by the system and method of the present invention. There is flexibility in converting files from one data state to another data state. Efficiency is provided by load balancing. Costs are minimized by calculating and comparing metrics representing the cost performing various conversions. The system of the present invention is also easily scalable. As new or additional converters become available, they can be easily incorporated into the network. In addition, incorporation of least cost routing techniques ensures that after conversion messages are delivered to their destinations in the least cost.

In one embodiment, the present invention is a system for converting a file from one data state to another in a least cost. The system preferably has a plurality of conversion nodes. Each conversion node has at least on conversion engine executing thereon for converting a file from one data state to another. The system also includes a conversion processor coupled to each of the conversion nodes by a network. The conversion processor determines a plurality of possible conversions to convert the file as required. In addition, the conversion processor associates a conversion cost with each possible conversion. The conversion processor causes the file to be transferred to the conversion node or nodes that can perform the conversion in the least cost.

In another embodiment, the present invention is a method for converting a file from one data state to another. The method includes the steps of determining a plurality of conversion paths for converting the file, computing a cost for converting the file according to each of the plurality of conversion paths, and converting the file using the conversion path having the least cost.

Thus, one object of the present invention is to provide efficient and flexible conversion of files.

Another object of the present invention is to provide least cost conversion options.

Another object of the present invention is to use scarce network resources in efficient ways.

Another object of the present invention is to provide a scalable or expandable conversion system.

Another object of the present invention is to facilitate communication between devices whose native data states are different.

These and other objects of the present invention are described in greater detail in the detailed description of the invention, the appended drawings and the attached claims.

DETAILED DESCRIPTION OF THE PREFERRED EMBODIMENTS

Figure 1:
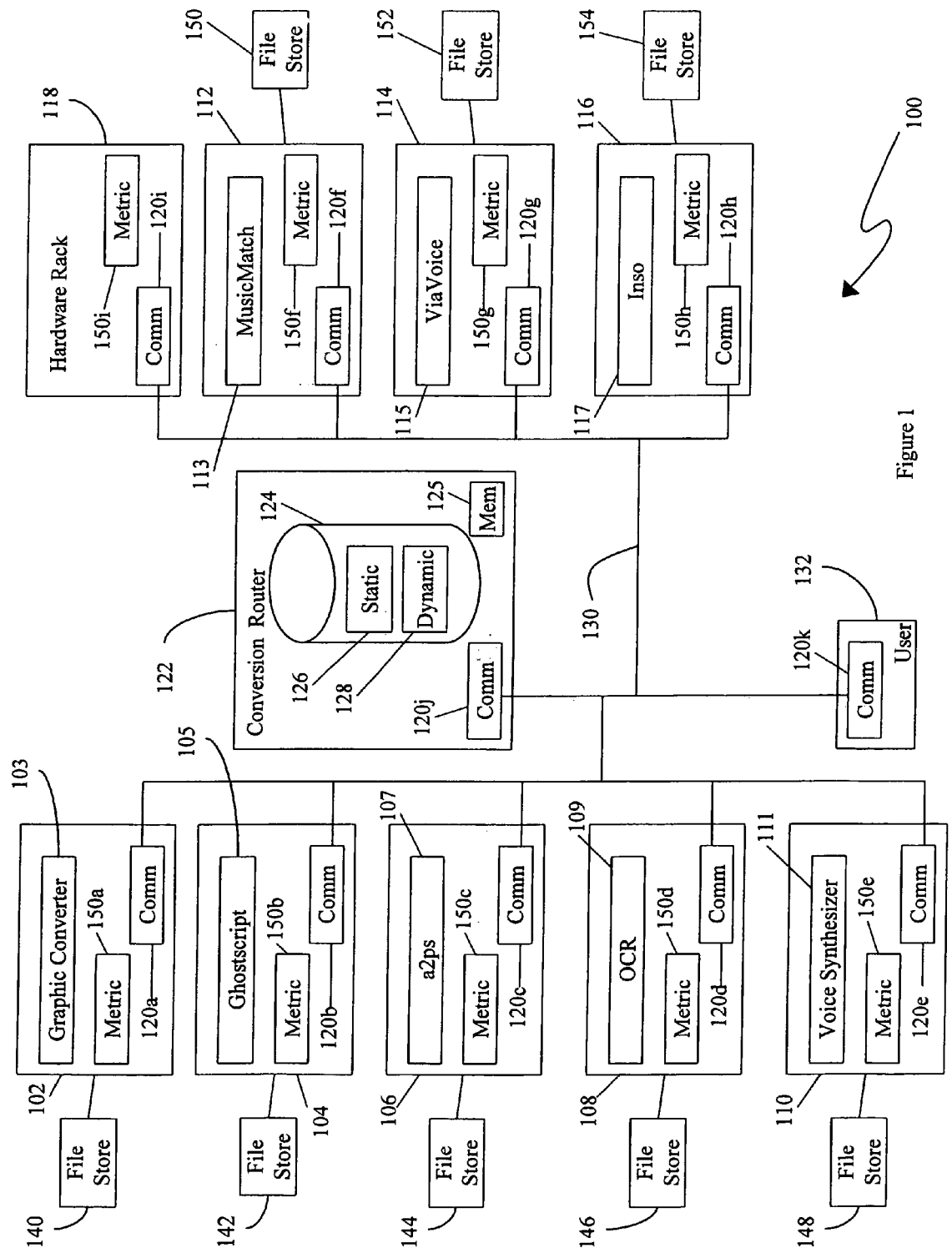
FIG. 1 is a schematic diagram of a system for converting files according to a preferred embodiment of the present invention.

FIG. 1 is a schematic illustration of a system 100 for performing data state conversions according to a preferred embodiment of the present invention. As used herein the term "data state" refers to the format and encoding type of a digitally-encoded message (DEM) at any given time. Computing platform 102 executes one or more graphics conversion engines, such as graphics conversion engine 103. Computing platform 102 has access to one or more mass storage devices 140 to store permanent and temporary files required for the conversion process. Computing platform 104 executes one or more Postscript-to-image conversion engines, such as ghostscript conversion engine 103. Computing platform 104 has access to one or more mass storage devices 142 to store permanent and temporary files required for the conversion process. Computing platform 106 executes one or more text-to-Postscript conversion engines, such as a2 ps conversion engine 107. Computing platform 106 has access to one or more mass storage devices 144 to store permanent and temporary files required for the conversion process. Computing platform 108 executes one or more bitmap-to-text conversion engines, such as OCR conversion engine 109. Computing platform 108 has access to one or more mass storage devices 146 to store permanent and temporary files required for the conversion process. Computing platform 110 executes one or more text-to-WAV conversion engines, such as voice synthesizer 111. Computing platform 110 has access to one or more mass storage devices 148 to store permanent and temporary files required for the conversion process. Computing platform 112 executes one or more WAV-to-MP3 conversion engines, such as MusicMatch conversion engine 113. Computing platform 112 has access to one or more mass storage devices 150 to store permanent and temporary files required for the conversion process. Computing platform 114 executes one or more WAV-to-text conversion engines, such as ViaVoice conversion engine 115. Computing platform 114 has access to one or more mass storage devices 152 to store permanent and temporary files required for the conversion process. Computing platform 116 executes one or more text-to-TIFF conversion engines, such as Inso conversion engine 117. Computing platform 116 has access to one or more mass storage devices 154 to store permanent and temporary files required for the conversion process. Any hardware conversion can be incorporated into hardware rack 118. Hardware rack 118 contains dedicated conversion routines that are performed preferably in real time by special purpose hardware designed to perform a particular conversion. Some conversions require a streaming capability, for example, streaming of WAV files to a message communicating device (MCD) such as a telephone. This streaming capability is preferably provided by a card available from DIALOGIC, for example the DTI/241 SC card. The DIALOGIC card can accept a WAV file, dial a number of a receiving phone and stream the WAV file to the destination phone.

Each computing platform 102, 104, 106, 108, 110, 112, 114, 116 and 118 has a metric calculator, designated as metric calculators 150a–i respectively. Metric calculators 150a–i determine metrics (described below) that are used to calculate costs. The costs are used by load balancing algorithms to determine which conversion engines to use for a particular conversion. The metrics are sent to computer 122 over network 130. The metrics include parameters to calculate both static and dynamic costs. In addition, each computing platform 102, 104, 106, 108, 110, 112, 114, 116 and 118 has a communication process executing thereon. The communication processes are designated as communication processes 120a–i respectively. Communication processes 120a–i are used to send data between the various computing platforms or node shown in system 100. Communication processes 120a–i are well-known to those skilled in the art and need not be described further.

In addition to the computing platforms described above on which the conversion engines are executing, there is a least cost conversion processor 122. Least cost conversion processor 122 is a computer that receives loading information from computing platforms 102, 104, 106, 108, 110, 112, 114, 116 and 118. The loading information includes information describing the load on the machine and the network. Preferably, the loading information is stored in a database 124. Communication with the computing platforms is through a communication process 120j. Such a communication process would be well-known to those skilled in the art and need not be described further. In an embodiment of the present invention, database 124 is organized as two tables, a static table 126 and a dynamic table 128. It would be apparent that static table 126 and dynamic table 128 can be stored in separate databases. Least cost conversion processor 122 uses static table 126 and dynamic table 128 as input to a least cost conversion algorithm (described below) to determine for any given message delivery request, which conversion engines should be used for a given conversion. In the preferred embodiment of the present invention, cost tables 126 and 128 are consolidated into a single cost table (described below).

In operation, least cost conversion routing computer 122 determines the optimal combination of conversion engines to perform a particular conversion. In the preferred embodiment of the present invention, the optimal combination of conversion routines is determined as that combination of conversion routines which performs the desired conversion in the least cost. For example, a user using a computer 132 desires to send a text message to a telephone so that it is played to a person using the telephone. Because the destination device is know to be a telephone, computer 132 determines that the output file type is an MP3 or WAV file. This determination can be performed through a well-known table lookup wherein the table contains entries having devices and corresponding file types for communicating with the device. After determining the file type for the destination device, computer 132 determines if the file type of the file to be sent is the same as the destination file type. In the present example, the file to be sent is of type text, whereas the destination file type is WAV of MP3. Thus, the file to be sent has a different type than the destination file type. Consequently, a conversion is required.

To perform the conversion, computer 132 contacts least cost conversion computer 122 using a communication process 120k, and through well-known messaging constructs, informs computer 122 that a conversion form text to WAV or MP3 is required. Communication process 120k would be well-known to those skilled in the art and need not be described further. Computer 122 determines the cost of performing these conversion using different conversion engines, including using intermediate conversions. In the preferred embodiment, the cost of ultimately sending the file to the destination is also considered. For example, long distance charges may be incurred to send the file from an available node that only plays WAV-formatted files, but no incurred when the file is sent from an available node that plays MP3-formatted files. Once the least cost conversion is determined, the file is converted and sent to the computing platform or platforms on which the required conversion engine or engines are executing. After conversion is complete, the file is sent to computer 132 for transmission, in this case, streaming to the destination telephone. In an alternative embodiment of the present invention, the computing platform on which the conversion is completed performs the sending of the file.

The computing platforms are preferably well-known PCs, or any other kind of computer, configured to execute one or more conversion engines. The computing platforms can be optimized to execute particular conversion engines. Such optimizations are beyond the scope of the present invention. Though not shown, different kinds of conversion engines can be executed on a single properly configured computing platform. Further, there can be multiple computing platforms assigned to execute the same conversion engine. In addition, each of the computing platforms can be of different types and have different operating systems executing thereon.

Each computing platform is connected to a network 130. Network 130 can be any computer network including for example, a local area network, wide area network, company intranet, or the Internet. Files for conversion can be transmitted from any computing platform to any other computing platform over computer network 130. Metrics related to each computing platform and network loading can also be transmitted to any computing platform over network 130, including least cost conversion processor 122 and user computer 132.

Figure 2:
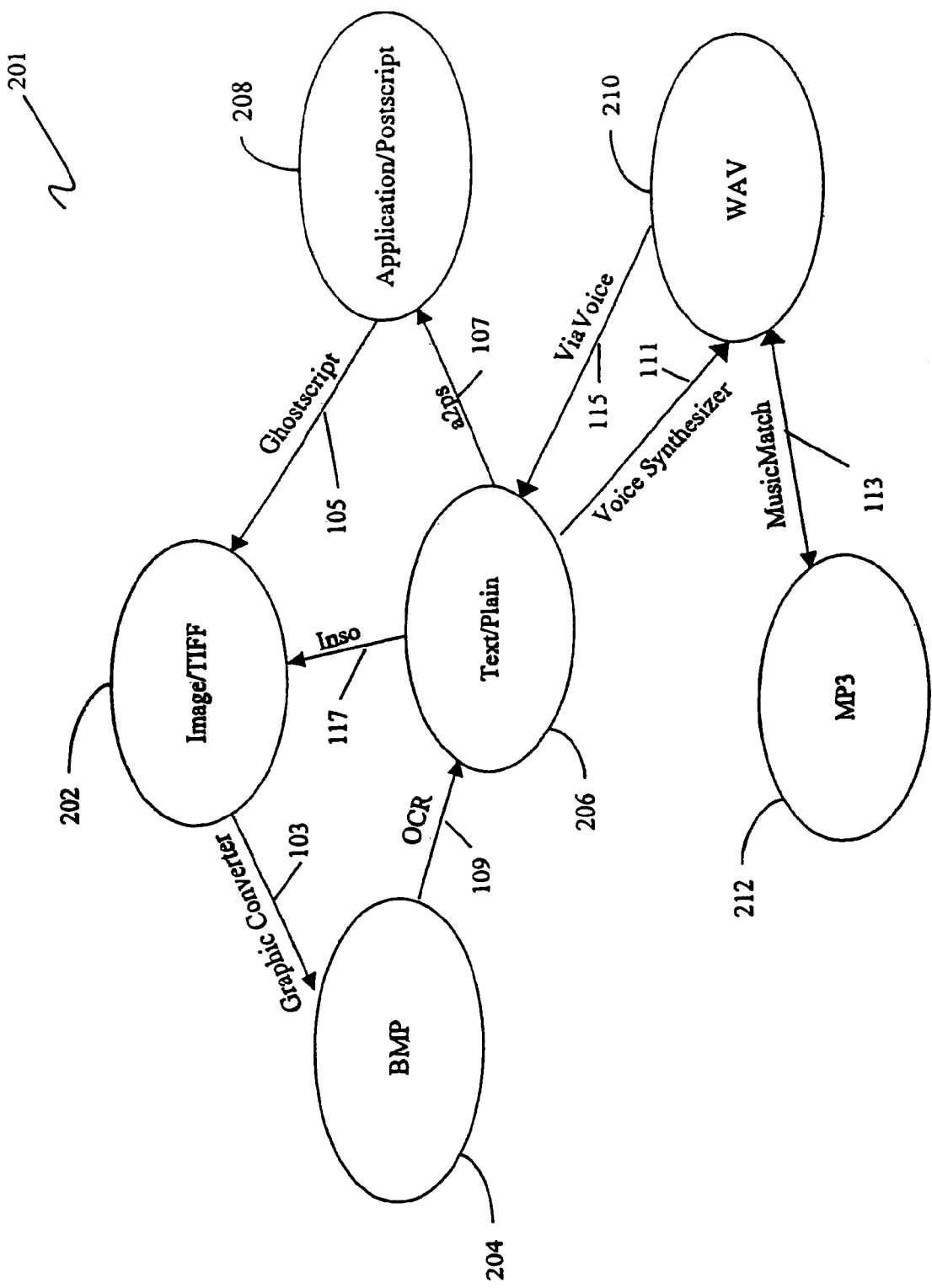
FIG. 2 is a directed graph representative of a system for converting files according to a preferred embodiment of the present invention.

As described above, the conversion engines to use to perform a particular conversion are determined on the basis of cost. The cost is determined using a directed graph that logically represents a least cost conversion system, such as system 100, and the available conversion engines. Directed graph theory is then applied to the graph to yield the least cost route. FIG. 2 is a directed graph 201 of the logical architecture of conversion routines that are available in a preferred embodiment of the present invention. Directed graph 201 shows six data states 202, 204, 206, 208, 210 and 212. The data states shown in FIG. 1 are image/tiff 202, BMP 204, text/plain 206, application/Postscript 208, WAV 210 and MP3 212. It should be noted that the choice of data states is implementation dependent and that additional or different data states can be used in alternative embodiments of the present invention.

Using a directed graph such as the directed graph illustrated in FIG. 2 allows the present invention to determine if a particular conversion is even possible. That is, the present invention can consult the directed graph to determine if there is a path for a particular conversion. If there is no such path, the present invention informs the user that the particular conversion cannot be done. This determination is made without having to make any conversions or send a file to any other device. Thus, conversions are performed with assurance that there is an available conversion engine for each step of the conversion required. This is especially useful where a particular conversion requires multiple steps. The directed graph of the present invention prevents a conversion from starting that cannot be completed.

For example, a user may desire to convert a file from Bitmap (BMP) format to MP3 format. While this conversion is not immediately apparent, using the directed graph of the present invention can determine how to carry it out. Namely, the present invention can first convert the BMP format file to a text format file using conversion engine 109, then to a WAV format file using conversion engine 111, and finally to an MP3 format file using conversion engine 113. A conversion from MP3 to BMP however, is not possible using the directed graph illustrated in FIG. 2. By consulting the directed graph, the present invention can make this determination prior to trying to complete any conversion, thereby saving system resources. In addition, the present invention preferably notifies the user that the requested conversion cannot be performed. It should be noted that the directed graph illustrated in FIG. 2 is only a preferred embodiment of the present invention. Other directed graphs can be constructed by those having ordinary skill in the art in accordance with the disclosure provided herein to meet specific system requirements.

Conversion engines corresponding to the conversion engines illustrated in FIG. 1 are represented by like-numbered edges 103, 105, 107, 109, 111, 113, 115 and 117. The conversion engines convert files from one data state to another data state. In the preferred embodiment of the present invention, conversion costs are assigned to each edge of the directed graph. These conversion costs (described in more detail below) can be separated into static costs and dynamic costs. Using well-known directed graph theory, the most efficient path between two data states (nodes) of the directed graph can be determined based on the assigned conversion costs. More information regarding directed graph theory can be found in Cormen, Thomas H., et al., *Introduction to Algorithms*, (MIT 1990) at pages 527–531, which is hereby incorporated by reference herein in its entirety.

In addition to the various file formats described above with respect to FIG. 2, there is an encoding type that can be considered. For example, a TIFF file can be encoded through compression using well-known compression software, such as gzip, as a zip file. Another encoding type available according to a preferred embodiment of the present invention is base 64, which is useful in SMTP transmissions, such as email. Finally, a file may be represented by its native, or raw, encoding. That is, the file has no additional encoding such as zip or base 64. Thus, there are three types of encoding that can be considered according to a preferred embodiment of the present invention: zip, base 64 and raw.

In a preferred embodiment of the present invention, all files are stored in their raw format (i.e., native format). When a particular file is to be transferred, the destination device type is determined. Encoding is performed in accordance with the destination device type. For example, when a file is destined for an email system, the file is first encoded as base 64 to prepare for SMTP transmission. This makes transfer of the file possible, while saving encoding changes for only the times they are required.

Figure 2A:
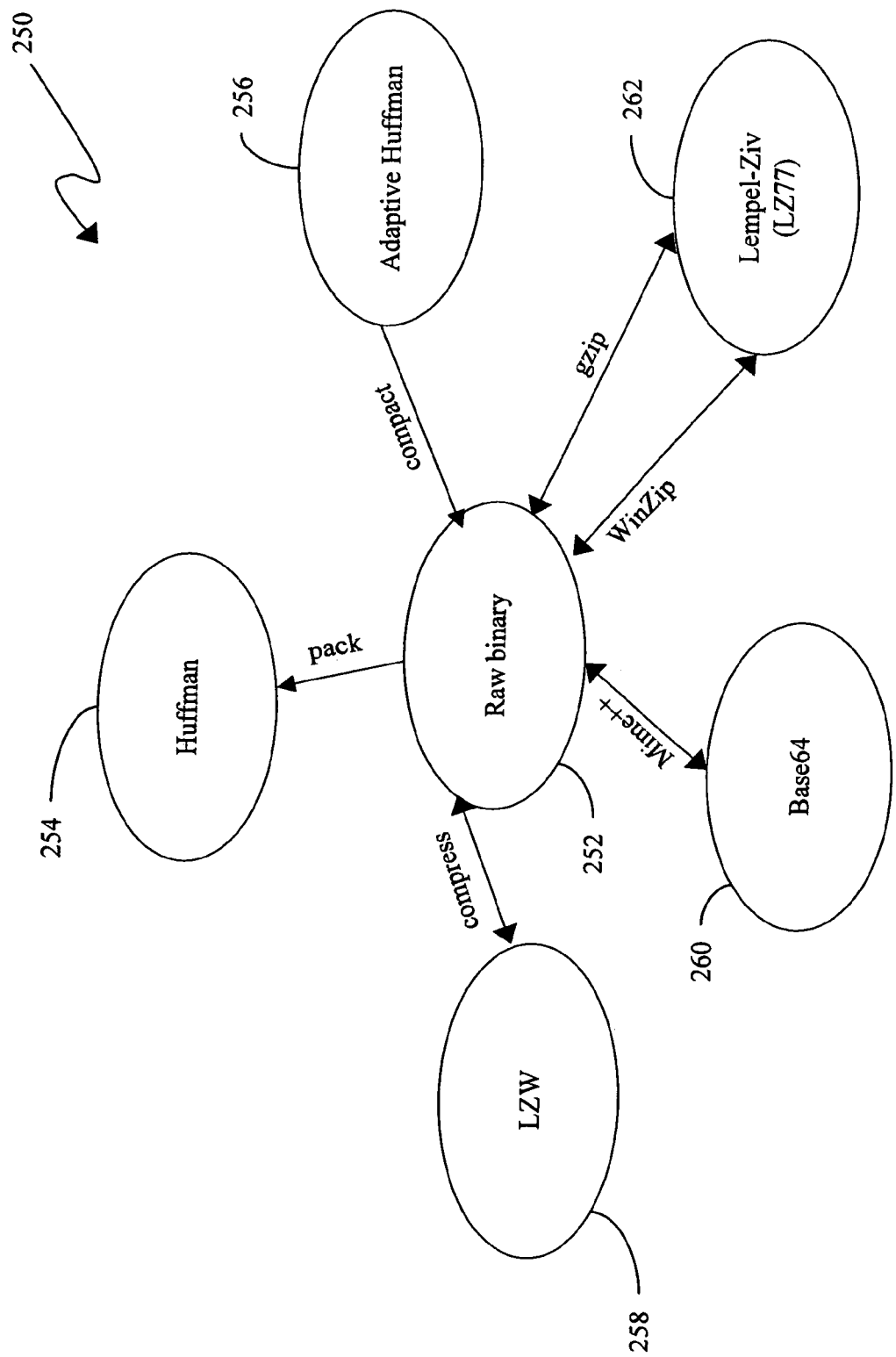
FIG. 2A is an exemplary encoding graph that can be used with a preferred embodiment of the present invention.

Encoding of files is described in more detail with reference to an encoding graph 250 illustrated in FIG. 2A. Preferably, each file starts in a raw binary format 252, though files can exist in any encoding format. As described above, conversion processor 122 can determine that the file should be encoded in a different format after conversion. If the files is to be encoded in a different format, it is preferably encoded in raw binary format 252 prior to conversion. Conversion processor 122 encodes the file in the desired format. For example, the file can be encoded to and from a Huffman format 254 using a pack utility. The file can be converted to and from an Adaptive Huffman format 256 using a "compact" utility. The file can be converted to and from an LZW format 258 using a "compress" utility. The file can be converted to and from a Base64 format 260 using the Mime++ freeware software library. The file can be converted to and from a Lempel-Ziv (LZ77) format 262 using a "WinZip" utility or a "gzip" utility. It would be apparent to those skilled in the art that other encoding formats and encoding routines to convert among the encoding formats can be used.

Figure 3:
FIG. 3 is an exemplary cost table according to a preferred embodiment of the present invention.

An exemplary cost table 300 is illustrated in FIG. 3. As shown in FIG. 3, there are multiple records, represented logically by the rows of table 300. In one embodiment of the present invention, each record of table 300 contains the following fields: engine type, source file type, destination file type, static cost, dynamic cost, static cost, machine address and special delivery. It would be apparent to those skilled in the art that a subset of these fields can be implemented in alternate embodiments of the present invention. For example, in the preferred embodiment of the present invention, cost table 300 contains the following fields: source file type, destination file type, static cost, dynamic cost, computing platform address and special delivery. The dynamic cost and static cost fields are shown in the same table in FIG. 3 for ease of presentation. In an alternate preferred embodiment, the dynamic cost and static cost fields are stored in separate data tables.

The engine type field is the name of the conversion software or a generic name for a particular conversion. The source file type field is the type of data contained in the source file. The destination file type field is the type of data contained in the destination file.

The static cost field is a scaled estimate of the static costs of the conversions described above. Static costs include the cost of executing a particular conversion routine, time required to perform a conversion for a file of a particular size, number of CPU cycles required to perform a conversion for a file of a particular size and cost of performing a conversion in hardware or software on a particular node.

The dynamic cost field is a scaled estimate of the dynamic costs of the conversions described above. Dynamic costs include current load on a particular conversion engine. The load indicates how busy the computing platform on which a conversion engine executes, for example, number of CPU cycles being used, memory being used, file I/O and combinations of these parameters. Another kind of dynamic cost that can be considered is the cost of a data link between computing platforms (for example, in terms of dollars per unit bandwidth). Data link cost considerations are described in more detail below with reference to FIG. 5A.

In the preferred embodiment of the present invention, static costs are derived by measuring absolute processing times on otherwise idle platforms, i.e., providing as close as 100% CPU usage to the conversion application. Dynamic costs are preferably derived either through system calls or by accessing the system information MIB (SNMP), for example, which is available with Solaris.

The computing platform address is the address of the computing platform on which the conversion engine executes. A file is sent to this address for conversion if the computing platform corresponding to this address is determined to provide the conversion in the least cost, or provide an intermediate step of the least cost conversion.

The special delivery field is a flag indicating that the delivery interface in the conversion unit requires special consideration. In the preferred embodiment, the special delivery is a true (set) or false (not set) flag. If the special delivery flag is set, then the conversion must be performed on a conversion engine that supports the special delivery. An exemplary use of the special delivery flag is in the case of a file being sent using a streaming protocol, the special delivery might be set so that the converted file is delivered to the streaming device more efficiently. For example, consider two video applications. In the first application, video is downloaded and stored on a device with sufficient drive space to accommodate the entire video and play it back arbitrarily. Such a device can be a personal computer. In the second application, because of device limitations, video is downloaded in very small chunks and played immediately. An example device might be a cordless phone with small video display. The first application only requires that the video be transferred as a file. In this case, the special delivery flag is not set. In the second application, the video must be streamed to the user, and the special delivery flag is set so that a delivery device capable of streaming is used.

In operation, when a file is sent, the sending computer determines the type of file being sent, the device performing the sending and, in some embodiments of the present invention, the receiving device. If the receiving device requires a file type other than the type of the file being sent, the sending computer consults table 300 to determine the potential conversions for converting the file to a type required by the receiving device. For example, if a TIFF file is to be sent over telephone to a human, the file may first be converted from TIFF to voice, i.e., from a TIFF file to a WAV file. The conversion can be indirect. That is, the file can pass through several conversions. For example, the TIFF file in the preceding example might first be converted to a text file, followed by conversion of the text file to a WAV file.

Figure 3A:
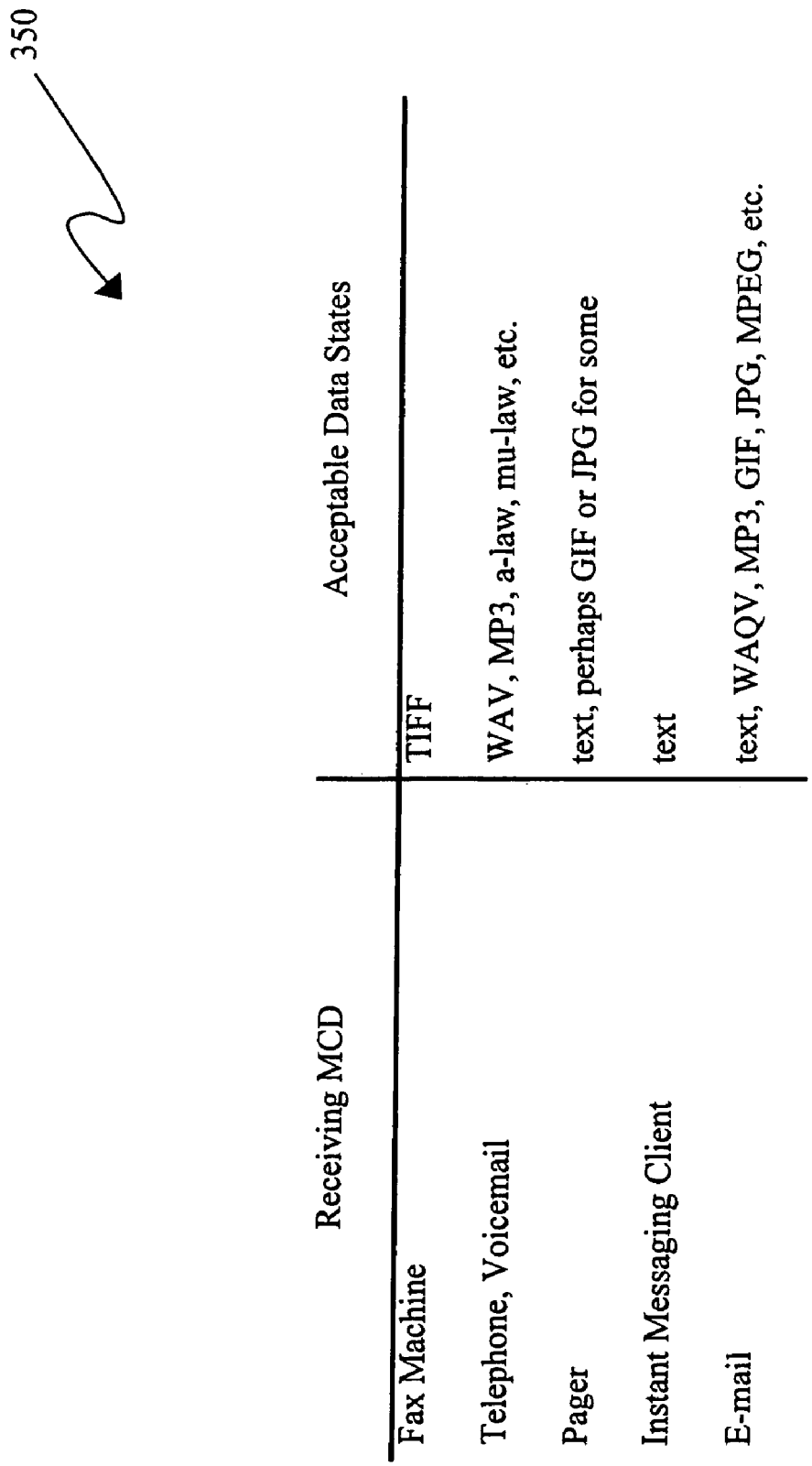
FIG. 3A is an exemplary destination-to-data state table.

FIG. 3A illustrates an exemplary table 350 that can be stored in a memory 125 on conversion processor 122. Table 350 contains a destination-to-data state mapping. Table 350 describes the potential terminal data states given a particular destination type. For example, referring to table 350, if conversion processor 122 determines that the destination device for a particular communication is a fax machine, it can consult table 350, determine that a TIFF file is required, and perform any necessary conversions to convert the communication to a TIFF file.

In an alternative embodiment of the present invention, a file can be transmitted to and stored on a receiving device in the most expeditious manner. When the file is actually needed, it is converted as required using the techniques disclosed herein. This is referred to as "conversion-on-demand." Conversion-on-demand eliminates using scarce system resources to perform conversions until the time they are actually needed, at which point, the specific conversion required is known. For example, a file can be sent as an attachment to an email in it's original format. When it is actually used, it is converted to a file type required by the application using it. Preferably, a destination-to-data state table such as table 350 is not used in conversion-on-demand processing.

Each of the ways of converting the file is assigned a cost as described above. The conversions can be sorted according to the cost of the conversion. This sorting step is not required to implement the present invention. The conversion with the least cost is chosen. Thus, the file is sent to the address of the computing platform or computing platforms on which the conversion engines or engines required to perform the conversion are executing.

Multiple engines are required, for example, where the least cost conversion requires several stages of conversion. Preferably, in the case of multi-stage conversions, table 300 is consulted only once to determine the optimal "route" through the directed graph. An alternative implementation of the present invention is to re-evaluate the route after each stage.

Figure 4:
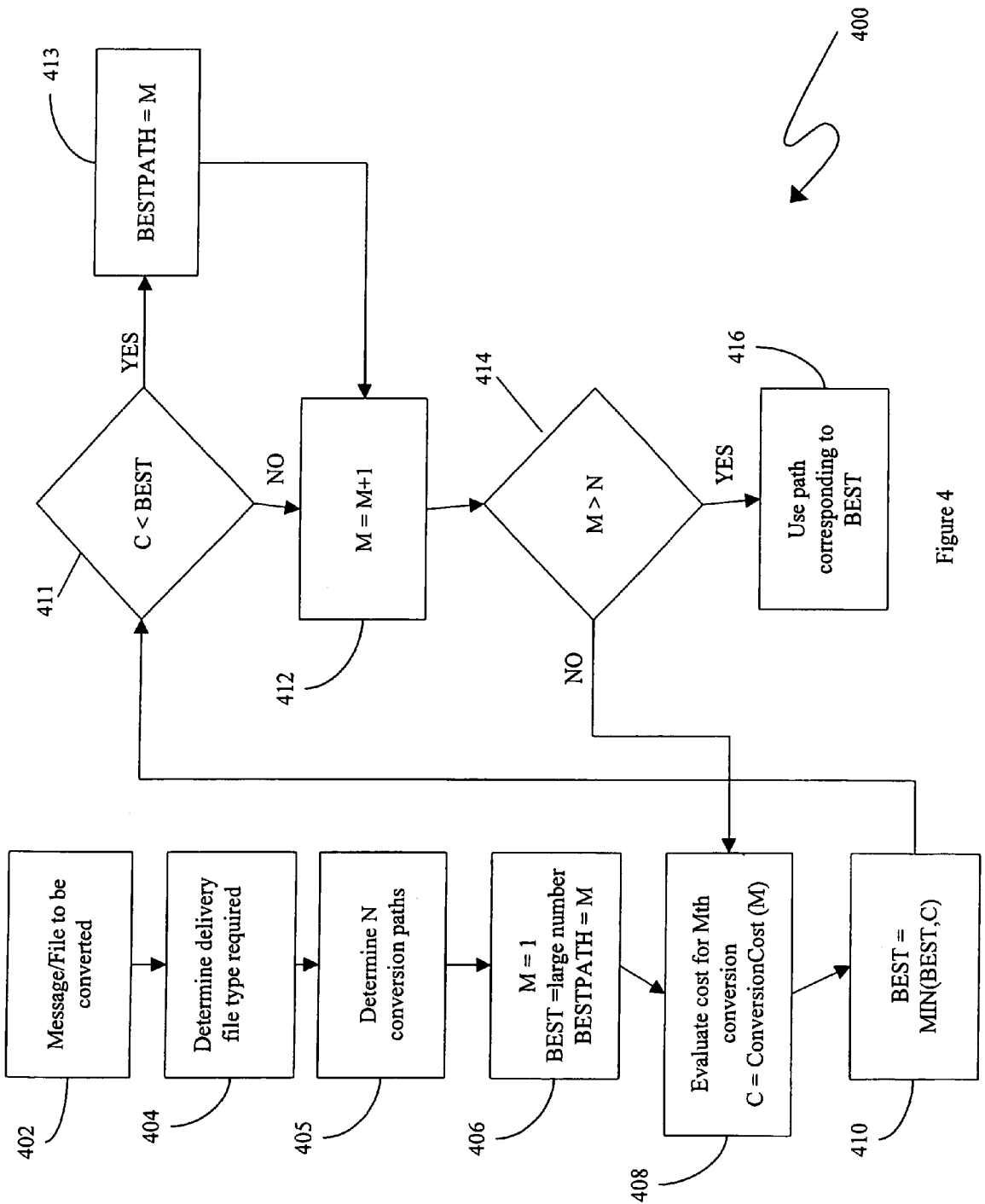
FIG. 4 is a flow chart for a conversion algorithm for converting files according to a preferred embodiment of the present invention.

A flow chart for a process 400 for determining the conversion to use is illustrated in FIG. 4. In step 402, a message or file is in a given data state. The destination file type of the message or file to be converted is determined in step 404. In a preferred embodiment of the present invention, the required conversion is determined from the destination device or sending device by consulting a destination-to-data state table such as table 350 described above. For example, if the destination device is a voice telephone, then a WAV file, MP3 file, liquid audio file or some other file type that can be played on the destination voice telephone is required. In step 405, the potential egress data states are determined. The number of states are stored in step 405. In step 406, variables are initialized that are required for the decision steps that follow. M is a counting variable that signifies the current path being checked. M is initialized to 1. BEST is a variable that stores the "best" (i.e., least cost) of the conversion paths that are being checked. BEST is initialized to a large value that it can never take in a particular implementation of the present invention. Preferably, this value is the largest value that can be represented on the particular processor on which the invention is implemented. It would be apparent to those skilled in the art, that the initial value for BEST can be any value for which BEST can be changed to indicate the least cost route. BESTPATH is a variable holding the best conversion path, as indicated by the value M, that has been found. The calculation to determine the cost of conversion is described below.

In step 408, the cost of conversion is determined for conversion path M and stored in variable C. Step 408 is described in further detail below. In step 410, the value of BEST is set equal to the lesser of the current value of BEST and the calculated conversion cost, C, of the present path M. If the value of C is less than the value of BEST, as determined in decision step 411, the value of M is stored in the BESTPATH variable in step in step 413. Steps 406, 408, 410, 411, 412 and 413 determine the best conversion path according to a preferred embodiment of the present invention. M is incremented to the next conversion path to be tested in step 412. It should be noted that initial value of BEST is selected such that when M=1, C will have a value less than BEST, so that BEST takes on the value of the first conversion on the first iteration of process 400. If there are no more paths to check, determined in decision step 414 by determining whether M is greater than the number of paths determined in step 405, then the conversion path corresponding to the value stored in BEST is selected as the least cost conversion path in step 416. The file is converted according to the least cost conversion path.

Figure 4A:
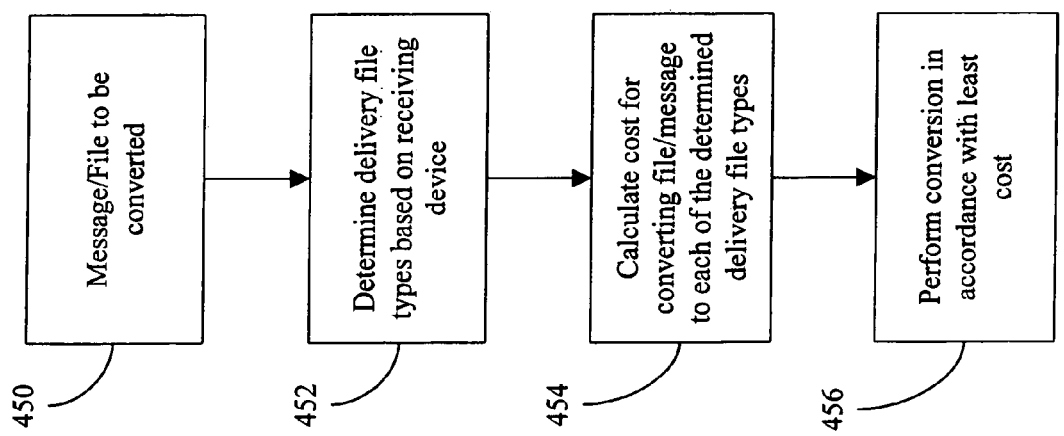
FIG. 4A is a flow chart for a for determining which conversion engine to use according to an alternative embodiment of the present invention.

An alternative preferred embodiment for determining which conversion to use is illustrated by the flow chart of FIG. 4A. In step 450 a message or file in TIFF format needs to be delivered to a telephone. In step 454, conversion processor 122 determines that the receiving device is a telephone and therefore requires the message or file to be delivered as a WAV or MP3 file. Consequently, the message or file must be converted from a TIFF file to a WAV or MP3 file. In step 454, the cost of each conversion (TIFF to WAV and TIFF to MP3) is calculated. Step 456 is comprised of steps 406, 408, 410, 411, 412 and 413 described above with respect to FIG. 4. In step 456, the conversion is performed according to the cheapest conversion path, as determined by the minimum of the calculated conversion costs.

As described above, table 300 includes static and dynamic costs. Static costs are costs that are not expected to change over time. Such costs include number of CPU cycles required to convert a single byte using a particular conversion engine. In the preferred embodiment of the present invention, the static costs (SC) are evaluated as:

$$SC = X_{CPU\ cycles} + Y_{bandwidth},$$

where X is the CPU cycles required per byte and Y is the bandwidth required to transmit a file of a given size to and from a particular conversion engine. As used herein, the term CPU refers to cycles on (1) a general purpose processor, e.g., a Pentium 3 processor, for software conversion, (2) an application specific IC (ASIC), erasable programmable memory (EPROM) or (3) digital signal processor (DSP). The value SC is stored in the static field of cost table 300 in the record (i.e., row) corresponding to the particular conversion engine for which it was calculated.

In addition to static costs, dynamic costs are stored in table 300. Dynamic costs are those costs which vary with time. Dynamic costs include conversion engine metrics such as the current load of a conversion engine. The current load can include such metrics as CPU usage, memory used, available disk space and license limits. In the preferred embodiment of the present invention, the dynamic costs (DC) are evaluated as:

$$DC = W_{CPU\ used} + Z_{load} + K_{license} + L_{memory} + P_{disk},$$

where W is an estimate of the processor CPU bandwidth (in cycles) currently being used, Z is an estimate of the load, K is a flag indicating whether there is sufficient license capacity to perform another conversion, L is memory (RAM) used and P is disk space used. When the conversion would cause the license capacity to be exceeded, K takes on a value guaranteeing that this conversion will not be the least cost conversion. Another dynamic cost is the availability of a particular conversion engine. Availability in this context is indicated by the presence of a record (row) in table 300 corresponding to the conversion engine. The value of DC is stored in the dynamic cost field of cost table 300 in the record (i.e., row) corresponding to the particular conversion engine for which it was calculated.

In the preferred embodiment of the present invention, the dynamic costs are updated periodically. The dynamic costs can be updated at any time however. More frequent updates provide a more accurate view of the system at a particular time, but come at the expense of increased network traffic and demand on conversion engine processing. In the preferred embodiment of the present invention, the dynamic cost for each processor executing a conversion engine is updated every 10 seconds.

The total cost (TC) for a particular conversion path is TC=SC+DC. To enable comparison of the potential conversion paths, the costs are normalized. Preferably, the costs are normalized between 0 and 100. In the preferred embodiment of the present invention, the normalization is performed by establishing a maximum value for each parameter for each processor on which conversion engines are implemented. For example, one processor might have 64 gigabytes of disk storage, whereas another processor might only have 2 gigabytes of disk storage. To normalize the disk capacity parameter then, current disk usage is measured as the current amount of disk space used divided by the maximum amount of disk storage capacity, 64 gigabytes for the first processor and 2 gigabytes for the second processor. In like manner each of the static and dynamic cost parameters is normalized between 0 and 100. The normalized values of the static and dynamic costs are stored in table 300.

Assigning costs to table 300 is equivalent to assigning a cost or value to edges 103, 105, 107, 109, 111, 113, 115 and 117 in FIG. 1. Using these costs or values, directed graph theory techniques are applied to determine the cheapest or best path to perform a particular conversion in accordance with the flow chart of FIG. 4 described above.

Figure 5:
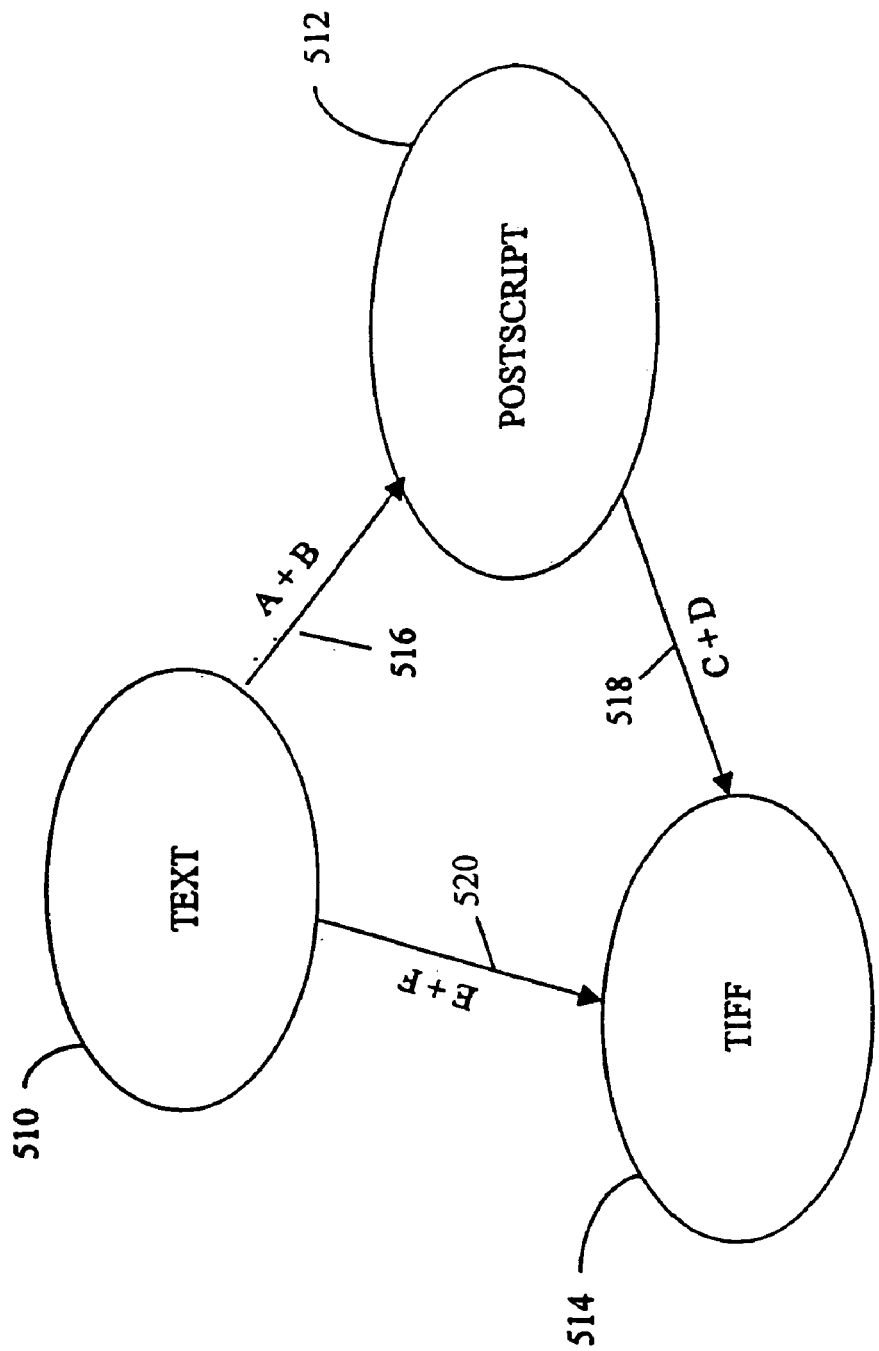
FIG. 5 is a directed graph comparing direct versus indirect conversion according to a preferred embodiment of the present invention.

An example for converting a file from a TEXT format to a TIFF format according to a preferred embodiment of the present invention is explained with reference to FIGS. 3 and 5 using the algorithm represented by the flow chart of FIG. 4. Three file data states are illustrated in FIG. 5, TEXT 510, POSTSCRIPT 512 and TIFF 514. As shown in FIG. 5, the file can be converted from a TEXT format to a TIFF format directly, using a conversion engine corresponding to edge 520, or by first converting the file to a text file by following edge 516, and then converting the text file to a POSTCRIPT file by following edge 518. The costs for these conversions are found in table 300. The total cost for converting the file directly to a WAV file is $TC_{dir} = E+F$. The total cost for converting the file indirectly is $TC_{ind} = A+B+C+D$. The system compares $TC_{dir}$ to $TC_{ind}$. If $TC_{dir} \geq TC_{ind}$ then the system uses the direct route to convert the file, otherwise the system uses the indirect route to perform the conversion. The file is transmitted to the recipient after the conversion is completed.

Figure 5A:
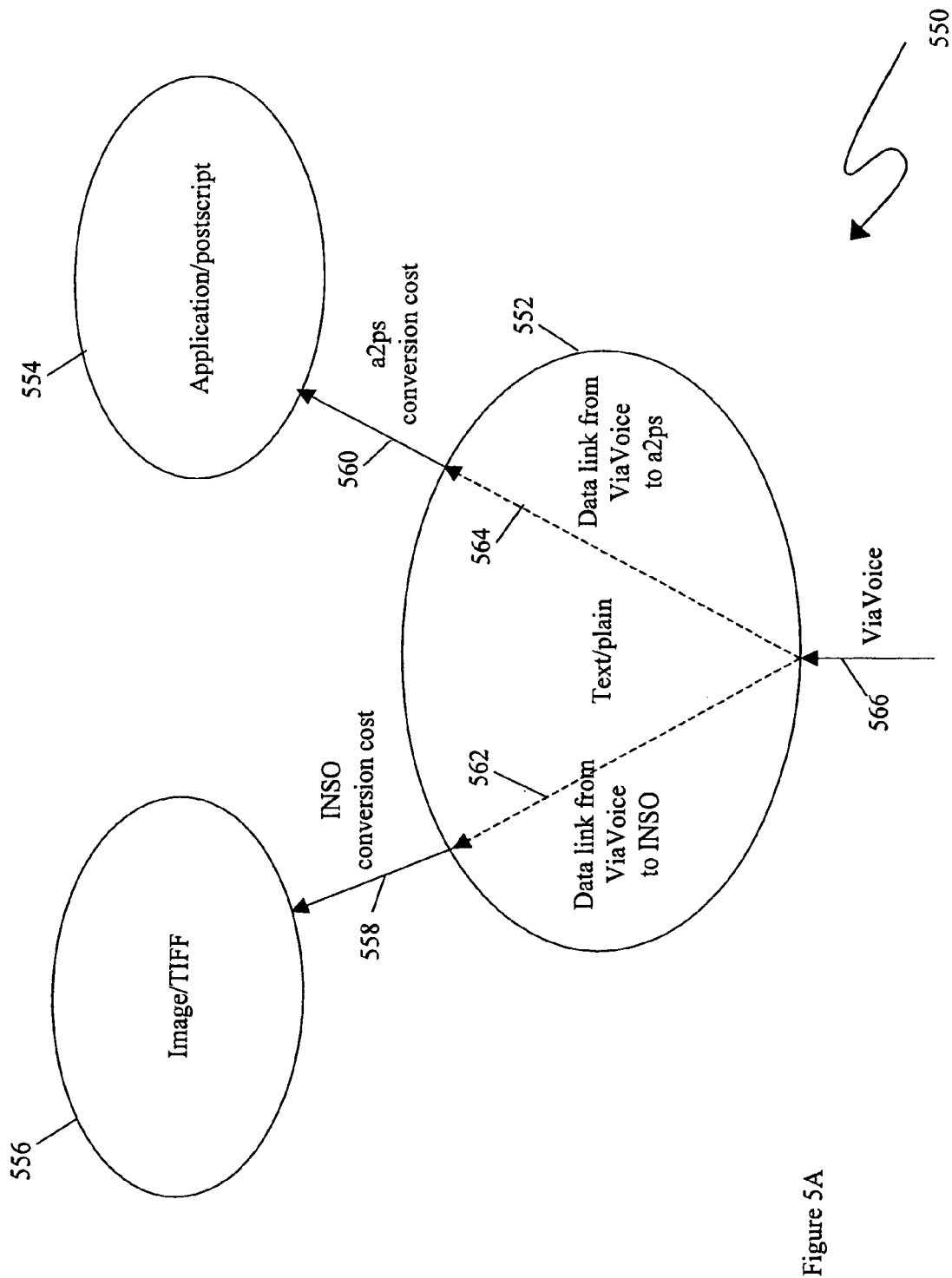
FIG. 5A is a directed graph illustrating cost considerations of data links.

FIG. 5A is a directed graph 550 that illustrates data link cost considerations. Referring to FIG. 5A, a three-node directed graph 550 contains the following exemplary nodes: a text node 552, a postscript node 554 and a TIFF node 556. Assume a WAV file (e.g., voice file) is to be converted to an image (e.g., a fax). That conversion processing can be performed by converting the WAV file to a text file, and then converting the text file to a TIFF file or a postscript file. The static and dynamic conversion costs of converting the text file to TIFF are represented by edge 558. The static and dynamic conversion costs for converting the text file to postscript. In addition, the data link costs associated with the particular conversions are represented by edges 562 and 564. Edge 562 represents the data link cost associated with converting the WAV file to a TIFF. Edge 564 represents the data link cost associated with converting the WAV file to a postscript. Now the total cost of converting a particular file is the sum of the conversion costs and the data link costs. The present invention will pick the conversion path having the least cost, and proceeds using the least cost conversion path.

The data link concept is scalable to multiple link edges, such as edge 566. In the case of multiple inbound edges, (i.e., where many conversion are required simultaneously), the data link cost is calculated from each inbound edge to each outbound edge, such as edged 558 and 560. The cost analysis is based on the total costs for all of the inbound edges.

Multiple conversions are performed for reasons other than indirect conversions. For example, an email that is destined for a telephone can have as attachments a TIFF file, WAV file and text file. Because the email is destined for a telephone, the system determines that all files should converted to WAV files or MP3 files. Thus, the email text, as well as the TIFF and text file attachments are converted to WAV or MP3 files according to the algorithm set forth above. The destination telephone is dialed and the WAV or MP3 file is played to the telephone.

In addition, the present invention provides for fault tolerance. For example, if a particular conversion engine fails for some reason, that row of the cost table is dropped. Consequently, the corresponding edge is removed from the graph. In an alternate embodiment of the present invention, the cost for conversion on that particular conversion engine is set prohibitively high. That is, the total cost to perform a conversion using that engine would be higher than any cost for using an operational conversion engine to perform the conversion, or higher than a preset availability threshold. The availability threshold is a predetermined value to indicate whether a particular conversion engine is available. If the total cost of a conversion engine equals or exceeds the availability threshold, the conversion engine is assumed not to be available. The availability threshold is used in the case where there is only one conversion engine being considered, and that conversion engine has, for some reason, failed.

The present invention is easily scalable. Adding a new conversion engine is accomplished simply by adding a record entry (row) into table 300 corresponding to the new conversion engine. Static and dynamic costs are calculated for the new conversion engine. These costs are stored in table 300, along with the other parameters required to complete a record entry in table 300. In addition, the appropriate software for obtaining static and dynamic cost metrics must be installed where the conversion engine is implemented on a processor not already installed in the system.

As described above, delivery costs can also be considered in making the determination of which conversion engine to use. For example, a text file may have to be converted to a WAV file or MP3 file so that it can be sent to a telephone. Assume that the cost for converting the file to an MP3 file is greater than the cost of converting the file to a WAV file. Further, assume that delivery of a WAV file incurs a long distance charge, while delivery of the MP3 file does not incur a long distance charge. In this example, the system may determine that using the MP3 conversion engine is optimal, even though the cost of converting to MP3 is higher than the cost of converting to a WAV file, because of the long distance charges.

Figure 6:
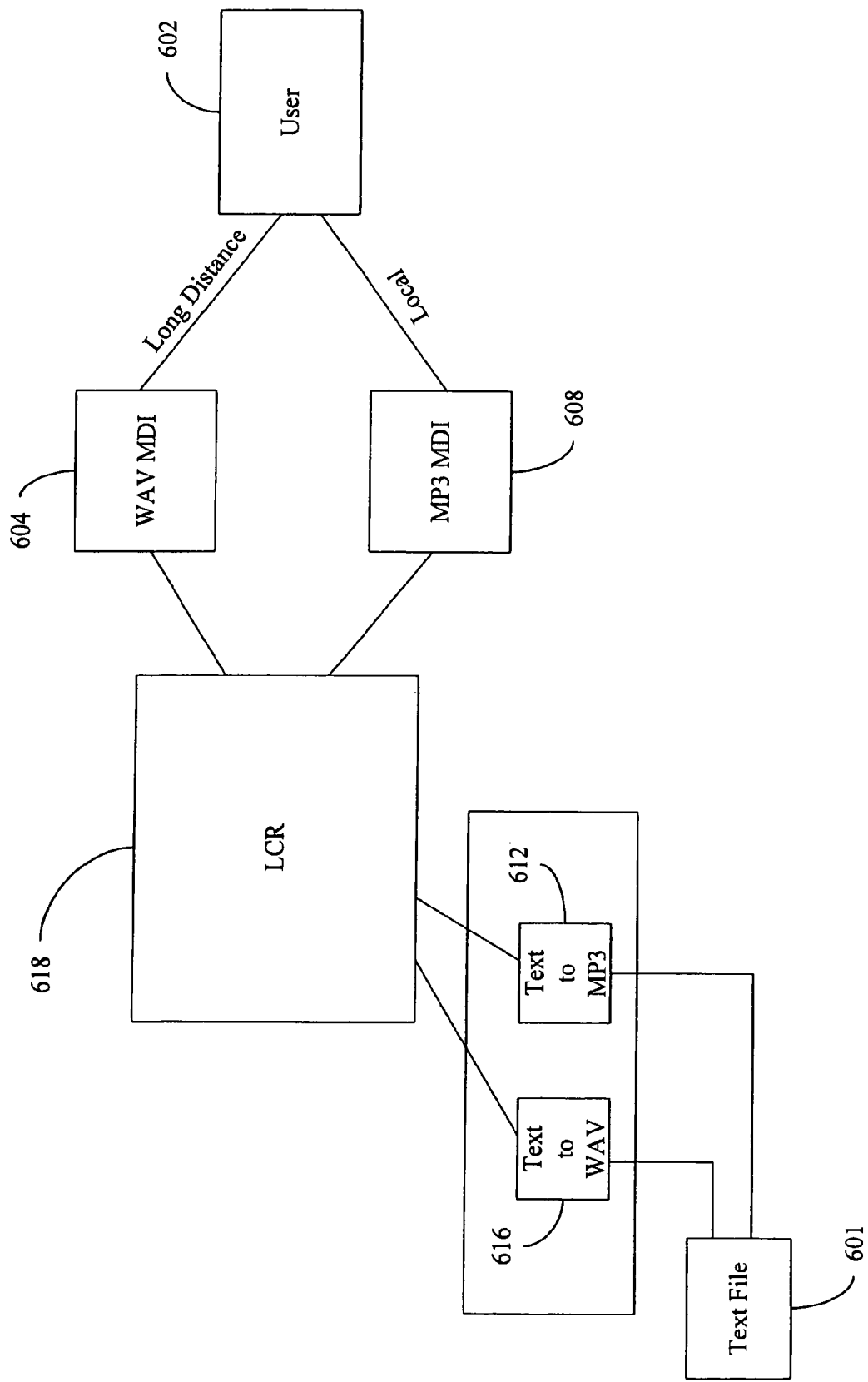
FIG. 6 is a schematic diagram of a system for considering message distribution when determining which conversion engine to use.

The consideration of delivery costs is illustrated schematically in FIG. 6. Referring to FIG. 6, it is desired to send a text file 601 to a user 602 in the most cost efficient manner. For the present example, it is assumed that there are two message delivery interfaces (MDIs). MDIs are the logical device that sends the message. The delivery interface can be telephony, email, facsimile, streaming device or other delivery interface. Message delivery interface 604 is for sending WAV files. Message delivery interface 608 is for sending MP3 files. For the present example, MDI 604 a long distance charge is incurred to deliver messages to user 602, where MDI 608 does not incur a long distance charges to deliver messages to user 602. A least cost routing (LCR) algorithm 618 determines the least cost for delivering the message to user 602 taking into account the cost of conversion and the cost of delivery of the message. The conversion costs are the costs of converting the message from text to WAV in conversion engine 616 or converting the message from text to MP3 in conversion engine 612.

Alternatively, long distance costs are considered prior to conversion costs. In this case, the least-cost path for delivery is determined by LCR algorithm 618. Then the message is converted as required so that delivery of the message, converted by the techniques described above, is accomplished according to the determined least-cost path.

Moreover, in the case of broadcast messages, only one conversion is generally required. That is, if in the case shown in FIG. 6, the WAV conversion is determined to be the least cost conversion and delivery option, then the cost for performing multiple text to WAV conversions only requires performing one text to WAV conversion. Thus, the second and subsequent messages in the broadcast would not incur a conversion cost.

As described above, conversions can take place automatically, that is, without human intervention. Thus, the requirement that remotely located operators must interface with one another to perform a particular conversion, or even that one operator must execute separate conversions on one or more processors is eliminated. In the preferred embodiment of the present invention, automatic conversions are performed as follows. Each communication process 120a–h actively listens on a TCP port for new conversion jobs via a poll system call. When a message containing a conversion job arrives at the port, the poll system call returns indicating that the message has arrived. The conversion job contained in the message is added to a work queue. The main thread goes back to listening on the port for new messages.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for converting an input file from a start data state to a final data state, comprising:

one or more conversion nodes, each node having executing thereon at least one conversion engine for converting a file from a first data state to a second data state, each conversion engine having an associated cost for performing a conversion of a file from the first data state to the second data state;

a least cost conversion processor to determine a plurality of conversion options for converting the file from the start data state to the final data state using one or more of the conversion engines, each conversion option capable of converting the input file from the start data state to the final data state, and to determine a conversion cost associated with each determined conversion option using the costs associated with the conversion engines and to determine a least cost conversion option from the determined plurality of conversion options; and means for transmitting the input file to one or more of the one or more conversion nodes in accordance with the determined least cost conversion option.

2. The system recited in claim 1, wherein said plurality of conversion options includes at least one option having at least one intermediate conversion.

3. The system recited in claim 1, wherein said least cost conversion processor calculates a routing cost associated with transmitting the input file or an intermediate file derived from the input file to one or more conversion nodes for each of said plurality of conversion options, and uses the calculated routing cost in determining which one or more of the plurality of conversion options to use to convert the file from the start data state to the final data state.

4. The system recited in claim 1, further comprising a cost table having stored therein an estimate of static costs and dynamic costs associated with a particular conversion.

5. The system recited in claim 4, wherein the static costs include at least one of cycles required by a CPU to convert a file of a particular size using a particular conversion engine and bandwidth required to transmit a particular file.

6. The system recited in claim 4, wherein the dynamic costs include at least one of current CPU load, memory usage and file I/O.

7. A method for converting an input file from a start data state to a final data state, comprising:
  executing at least one conversion engine having a cost for converting a file from a first data state to a second data state;
  determining a conversion cost associated with each of a plurality of conversion options, each conversion option capable of converting the input file from the start data state to the final data state;
  examining the determined conversion costs to identify a least cost conversion option;
  determining a conversion path associated with the identified least cost conversion option; and
  transmitting the file according to the determined conversion path.

8. The method recited in claim 7, further comprising the determining at least one conversion option having an intermediate conversion.

9. The method recited in claim 7, further comprising:
  calculating a cost associated with transmitting the input file in accordance with each of said plurality of conversion options in addition to the determined conversion costs; and
  using the calculated cost associated with transmitting the file in determining the least cost conversion.

10. The method recited in claim 7, further comprising the step of creating a cost table having stored therein an estimate of static costs and dynamic costs associated with a particular conversion option.

11. The method recited in claim 10, further comprising the determining at least one of cycles required by a CPU to convert a file of a particular size using a particular conversion engine against a file of a particular size and the bandwidth required to transmit a particular file.

12. The method recited in claim 10, further comprising determining at least one of number of CPU cycles used, memory usage and file I/O.

13. A system for sending a file in a first data state from a sending message communicating device to a receiving message communicating device that receives the file in a second data state, comprising:
  a first process to determine the first and second data states;
  a least cost conversion processor to determine one or more conversion options capable of converting the file from the first data state to the second data state in accordance with the determined first and second data states, said least cost conversion processor, comprising:
    a second process to assign a conversion cost to each of the one or more conversion options and select a conversion option having the least cost;
    a third process to convert the file in accordance with the selected conversion option; and
  a message distribution interface, for transmitting the message to the receiving message communicating device.

14. The system recited in claim 13, further comprising a cost table having a plurality of entries corresponding to a conversion engines that are available to perform conversions, the entries having dynamic and static cost information for performing a particular conversion.

15. The system recited in claim 13, wherein the least cost conversion processor includes the cost of delivering the file to the second message communicating device in addition to the conversion costs.

16. The system recited in claim 14, wherein an additional conversion engine is added to the system by creating a new entry in said cost table.

17. The system recited in claim 13, wherein said second process normalizes the costs that are assigned to the one or more conversion engines.

18. A method for sending a file in a first data state from a sending message communicating device to a receiving message communicating device that receives the file in a second data state, comprising:
  determining the first and second data states;
  determining one or more conversion options each of which is capable of converting the file from the first data state to the second data state using the determined first and second data states comprising:
    assigning conversion costs to the determined one or more conversion options;
    selecting the conversion option having the least cost;
    converting the file in accordance with the selected conversion option; and
    transmitting the converted file to the receiving message communicating device.

19. The method recited in claim 18, further comprising creating a cost table having a plurality of entries corresponding to a conversion engines that are available to perform conversions, the entries having dynamic and static cost information for performing a particular conversion.

20. The method recited in claim 18, further comprising calculating a cost of delivering the file to the second message communicating device.

21. The method recited in claim 19, further comprising performing an intermediate conversion to convert the file from the first data state to the second data state.

22. The system method recited in claim 18, further comprising of normalizing the costs that are assigned to the one or more conversion engines.

23. A least cost conversion processor for converting a file from a first data state to a converted file having a second data state in a least cost, comprising:
  means for obtaining static and dynamic cost data regarding a plurality of conversion engines that can be used to convert the file from one data state to another data state;
  a cost table containing entries corresponding to the obtained costs for the plurality of conversion engines;
  means for determining a plurality of conversion options that are capable of converting the file from the first data state to the second data state using one or more of the plurality of conversion engines:
  means for assigning a cost to each conversion option using the costs in the cost table assigned to the conversion engines;
  a process to select the least cost conversion option from the determined conversion options as a selected conversion option; and means for sending the file in the first data state to the conversion engines used by the selected conversion option.

24. The least cost conversion processor recited in claim 23, wherein the cost table further comprises entries relating to static and dynamic costs associated with using a particular conversion engine.

25. The least cost processor recited in claim 23, wherein the costs stored in the cost table are normalized.

26. The least cost processor recited in claim 23, further comprising means for performing an intermediate conversion to convert the file from the first data state to the second data state.

27. The least cost processor recited in claim 23, wherein the cost assigned includes a cost for delivering the converted file to a recipient.

28. The least cost processor recited in claim 23, further comprising means for receiving the converted file from the selected conversion engine.

* * * * *